United States Patent [19]

Chavez

[11] 4,096,478
[45] Jun. 20, 1978

[54] INTRA-PULSE MTI SYSTEM WITH RANGE AMBIGUITY SUPPRESSION

[75] Inventor: Joe D. Chavez, Tarzana, Calif.

[73] Assignee: International Telephone and Telegraph Corporation, New York, N.Y.

[21] Appl. No.: 408,967

[22] Filed: Oct. 12, 1973

Related U.S. Application Data

[63] Continuation of Ser. No. 159,751, Jul. 6, 1971, abandoned.

[51] Int. Cl.² .......................... G01S 9/42; G01S 9/233
[52] U.S. Cl. .............................. 343/7.7; 343/17.2 PC
[58] Field of Search ........................... 343/7.7, 17.2 PC

[56] References Cited

U.S. PATENT DOCUMENTS

| | | | |
|---|---|---|---|
| 3,225,349 | 12/1965 | Thor | 343/17.2 PC X |
| 3,905,033 | 9/1975 | Moore et al. | 343/17.2 PC X |
| 3,968,490 | 7/1976 | Gostin | 343/17.2 PC X |
| 4,053,884 | 10/1977 | Cantrell et al. | 343/17.2 PC X |

*Primary Examiner*—T.H. Tubbesing
*Attorney, Agent, or Firm*—William T. O'Neil

[57] ABSTRACT

A dual-pulse coherent MTI system having a time interval between pulses as short as zero. The pulses are "chirped" in opposite sense, the latter constituting a unique coding for eliminating range ambiguity problems. Video return signals are received and applied to two parallel channels each containing pulse compression and limiting circuits. The pulse compression circuits are matched uniquely to the positive chirp slope pulse in one channel and to the negative chirp slope pulse in the other channel. The channel corresponding to the earlier of the two pulses is subjected to a fixed delay of one pulse width before the outputs of the channels are differenced to produce a net MTI signal.

7 Claims, 2 Drawing Figures

INTRA-PULSE MTI SYSTEM WITH RANGE AMBIGUITY SUPPRESSION

This is a continuation of application Ser. No. 159,751, filed July 6, 1971, now abandoned.

BACKGROUND OF THE INVENTION

1. Field of The Invention

The present invention relates to moving target indicator radar systems, and more particularly to MTI radar systems employing two-pulse short interval techniques.

2. Description of the Prior Art

The patent, textbook and periodical literature describes a wide assortment of MTI radar systems. Fundamentally, MTI radar systems operate by examining signal returns resulting from successive transmitted pulses. Some type of cancellation, applicable to fixed returned signals corresponding to non-moving targets, or some type of filtering is employed to reject signals corresponding to non-moving targets. In the broadest sense, filtering may be said to include a wide variety of discriminatory devices ranging from frequency-chirp matched filters, Doppler component filters, and long period storage devices as used in some types of MTI systems.

A review of the prior art in respect to MTI radar may be conducted by examination and study of Chapter 17 of the text entitled "Radar Handbook" by Merrill Skolnik, a McGraw-Hill book (1970). That reference provides a bibliography of additional references and will serve to acquaint the reader not only with the current state of the MTI art, but also to apprise him of the problems confronted by the designer in that particular art.

Since the present invention makes use of the concepts of transmitted pulse "chirp" and receiving system pulse compression, Paragraph 17.15 of the aforementioned reference is of particular background interest. The reader is also directed to the textbook "Modern Radar Analysis, Evaluation, and System Design" by Raymond S. Berkowitz, a John Wiley and Sons book (third edition, August, 1967). In that particular reference book, the whole of Chapter 2 of Part IV is devoted to the subject of linear $f$-$m$ pulse compression, which is useful background information in understanding the present invention.

Among the design problems encountered in the MTI systems are the problem of blind speed, antenna scan modulation and clutter fluctuation effects. Super-clutter visibility for targets moving in distributed clutter is also a problem area in which prior art systems have been deficient. The manner in which the present invention solves or eliminates certain significant problems encountered in the prior art will be understood as this description proceeds.

SUMMARY

In accordance with the start of the art in MTI radar systems, it may be said to have been the general object of the present invention to develop an MTI system having a high first blind speed, good super clutter visibility for targets moving in distributed clutter and also good sub-clutter visibility for targets moving in joint clutter, while preserving or providing good CFAR (constant false alarm rate) action and relatively high range resolution for a given long-range detectability. The device is relatively insensitive to antenna scan modulation and clutter fluctuation effects. The technique of the present invention is based on the use of a two-pulse coherent MTI system to discriminate between moving and stationary targets. As shown and described hereinafter, the time interval between the two pulses of the transmitted format is zero, although the system does not depend on that particular choice for operability. The use of a short or zero interval between transmitted pulses overcomes the detrimental effects of antenna scan modulation, clutter fluctuation and slow radar platform motion which normally limit the performance of long range coherent MTI systems. In addition, it will be realized that the very short MTI interval thereby provided is tantamount to the use of an extremely high pulse repetition frequency in a prior art MTI radar system, and the result is therefore a very high first blind speed.

It will be realized that the use of a short MTI interval introduces the problem of amgibuous range returns, a fact which has severely limited the use of two-pulse short interval MTI systems in long range radars heretofore. The present technique uses a transmission with unique coding of each of the two pulses to resolve the range ambiguity in a manner which will be apparent as the description proceeds.

The first half of the transmitted pulse is chirped over a frequency band of $\Delta F$ in a positive direction while the second half of the pulse is chirped in a negative direction. The selection of a positive chirp slope in the first half and negative in the second half will be realized to be arbitrary, however, it being possible to instrument the system oppositely with appropriate modification of the compression filtering format.

The two chirp slopes must be generated coherently about the same center frequency and the two slopes must be carefully matched, however component and sub-system techniques for accomplishing these requirements are well known in the present day radar art.

The two signals or two halves of the transmitted pulse envelope may be thought of as comprising a single transmitted pulse, hence the term - "intra-pulse MTI".

After transmission, a normal ranging time of $T_R$ is provided which is commensurate with the radar maximum range. During each ranging interval, target signals from each half of the transmitted envelope are received and processed in the twochannel system of the receiving equipment. The upper channel has a pulse compresser matched to the positive chirp signal and the lower channel has a pulse compresser matched to the negative chirp signal. Pulse compression is accomplished in two successive stages separated by a limiter circuit in each channel. The system depends upon the unique instrumentation of the pulse compression function in order to effectively measure target motion from one-half of the transmitted pulse to the other half. The two receiving channels are time aligned by a deduction of a fixed delay from the earliest processed data equal to $\Delta T$ (half of the total transmitted pulse) and the outputs of the two channels are differenced vectorially. The result is cancellation of signals corresponding to non-moving targets and transmission through the differencer of signals which are moving and therefore do change physical position over the duration of thetotal transmitted pulse. The details of the pulse compression instrumentation will be described as this description proceeds.

DESCRIPTION OF THE PREFERRED EMBODIMENT

Figure 1:
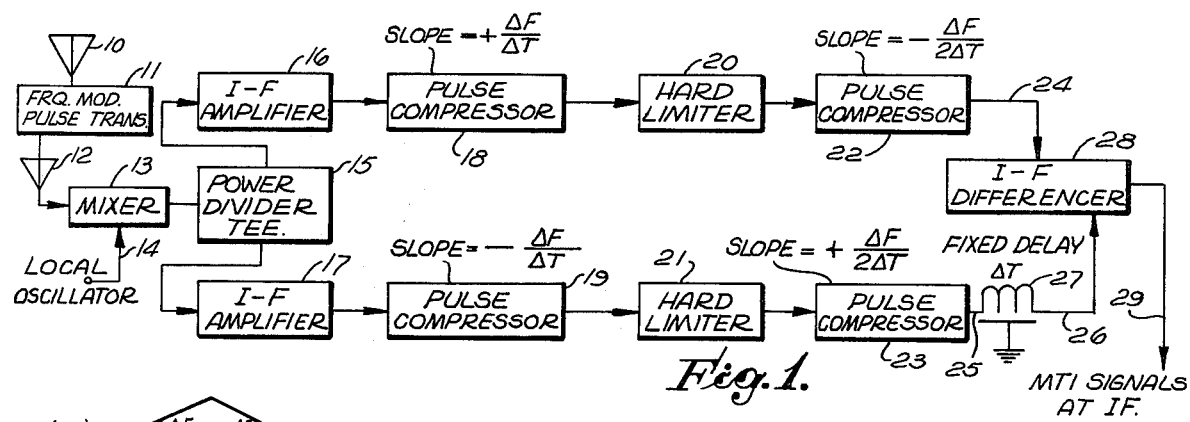
FIG. 1 is a functional and structural block diagram of the transmitting and receiving system in accordance with the present invention.

In describing the structure and operation of the system according to the invention as depicted in FIG. 1, appropriate reference will be made from time to time to the waveforms of FIG. 2.

In FIG. 1, both transmitting and receiving systems are depicted in block form. The transmitting antenna 10 and receiving antenna 12 are to be understood to be any of the commonly used directive scanning antennas suitable for MTI system use. In fact, these transmitting and receiving antennas may be one antenna with a suitable duplexing system, as is well known in the radar arts. Reference to this and the details of the antenna scan drives, etc., which form no part of the present invention of themselves have been omitted from the drawings for the sake of simplicity and a concise description of the novel aspects of the instrumentation.

FIG. 1 illustrates the transmitter chirp function. Since the present system is an improved type of frequency modulated pulse and pulse compression system, it achieves the advantages accruing to such systems fundamentally. Among these advantages is the relatively high average power on target as a result of the relatively long transmitted pulse. A typical duration for the total transmitted pulse may be 100 microseconds, a figure that will be taken for the sake of the present description. This duration is composed of two pulse halves each of duration $\Delta T$. Accordingly, the received pulse energy envelope at $(b)$ of FIG. 2 is similarly $2 \Delta T$ in duration. The depiction of the transmitted pulse of FIG. 2 ahead of the time-aligned receiver waveforms $(b)$ through $(j)$ is illustrative of the fact that a ranging interval exists between transmitted and received pulses, although the particular time relation compared to the 100 microsecond pulse duration figure is not necessarily scaler.

The embodiment of the present invention described involves signal processing in the IF domain. Accordingly, it will be understood that the waveforms $(a)$ through $(k)$ of FIG. 2 are representative of signal amplitudes as a function of time. The actual signals would be bi-polar IF signals, however, the FIG. 2 waveforms would be properly representative of IF signal amplitudes converted to video signals.

The frequency modulated pulse transmitter 11 includes a pulse repetition frequency generator as well as means for accurately and coherently generating positive and negative chirp slopes of the said transmitted pulse about the same center frequency. The instrumentation of the block 11 is readily accomplished by persons skilled in this art.

Figure 2:
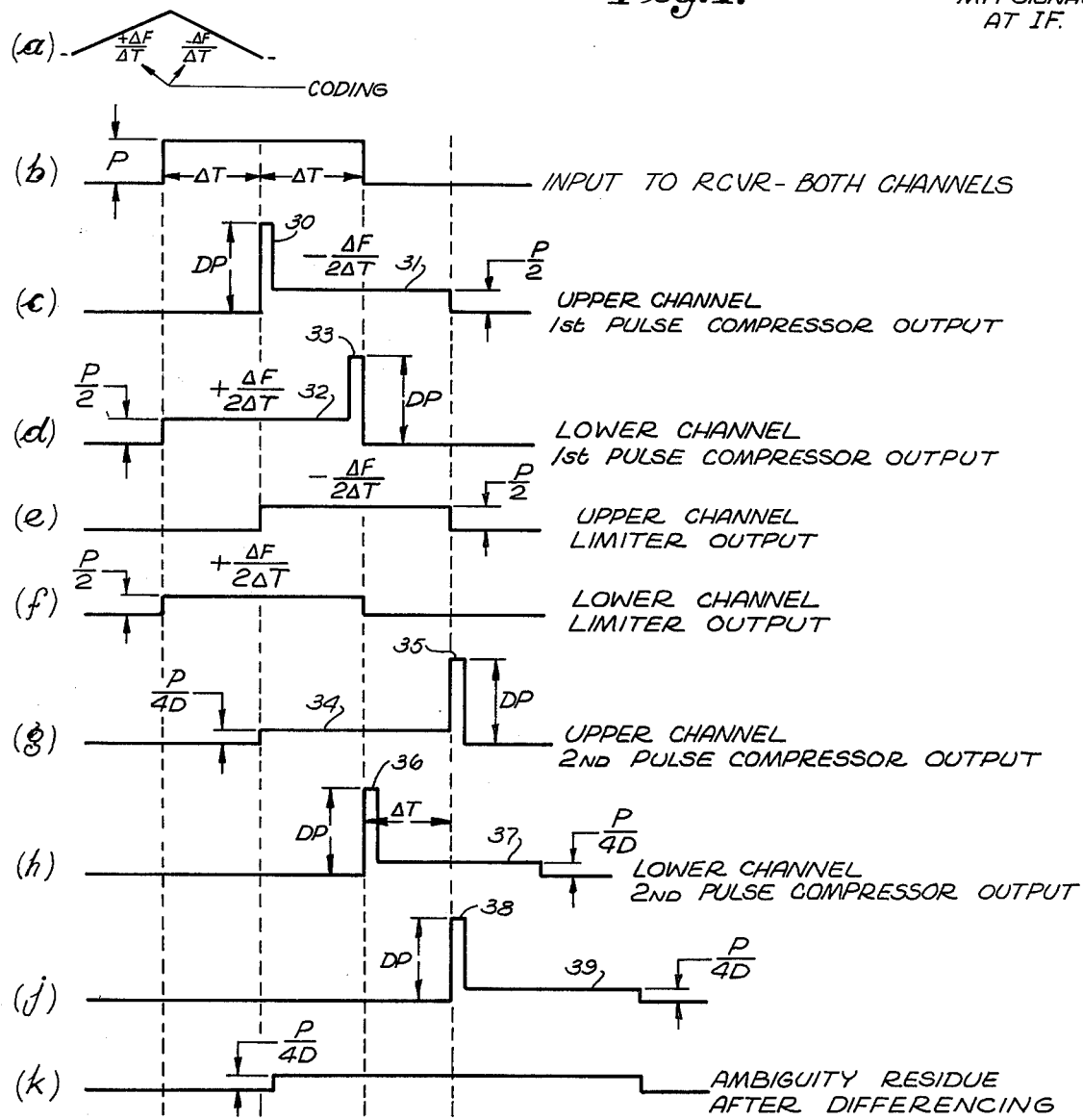
FIG. 2 is a waveform timing diagram depicting the signal characteristics at various points in FIG. 1.

For the sake of relatively simple treatment of the receiving function, the waveforms of FIG. 2 and their description in relation to FIG. 1 is based on the point target assumption. Obviously return signal energy would be present throughout most or all of the ranging interval after each transmitted pulse in an environment containing the usual assortment of fixed and moving targets. The operation of the system, once understood in connection with the point target, however, will be appreciated in relation to the practical signal environment.

To go forward with the description in accordance with the foregoing, it will be noted that a signal envelope of $2 \Delta T$ in duration and arbitrary power level P is received at antenna 12 from the said point target. A mixer 13 and local oscillator source 14 provide the usual and straightforward down-conversion to the IF domain. The power divider 15, which is not more than a straightforward well known Tee or power splitter device suitable for operation at the IF band, splits the received energy into two substantially equal inputs to the IF amplifiers 16 and 17. These IF amplifiers constitute the input devices to the two receiving channels of the device of the present invention. Based on the nature of the transmitted pulse frequency-versus-time function in accordance with FIG. 2($a$), it follows that the pulse compression slope of the pulse compressor 18 should be $+ \Delta F/T$ and that of pulse compressor 19 should be $- \Delta F/T$. The output of pulse compressor 18 is depicted in FIG. 2 waveform $(c)$ and the output of 19 is similarly depicted at waveform $(d)$ of FIG. 2. Stated otherwise, it may be said that the upper channel has a pulse compressor (first stage) matched to the positive chirp signal and the lower channel has a similar pulse compressor matched to the negative chirp signal. Each channel will exhibit an output spectrum including a peaked signal and a "smeared" signal at the output of the first compressor stage. The upper channel will compress the signals from the first half of the pulse and will further disperse the signals from the second half of the pulse. Similarly, the lower channel will compress signals from the second half of the pulse and further disperse signals from the first half of the pulse. This phenomenon is identifiable in waveform $(c)$ and $(d)$ of FIG. 2, respectively, wherein the said peak signals are 30 and 33 and the "smeared" or further dispersed frequency spectra are observed at 31 and 32. The amplitude of the peaked signal is identified as DP which is the product of the compression ratio of the system and the arbitrary power P. The so-called "smeared" residue will be seen having a signal amplitude of half the arbitrary power P.

The upper and lower channel hard limiters 20 and 21, respectively, are adjusted to eliminate the peaked signals 30 and 33, resulting in the waveforms $(e)$ and $(f)$ of FIG. 2, respectively, which are then applied to the second pulse compressors 22 and 23, respectively. It will be noted that the slope of these second compressor stages is the reverse of that applied at the first pulse compressor stage in each of the channels. That is, the second upper pulse compressor 2 has a response slope equal to a $- (\Delta f/2\Delta t)$ and the lower corresponding stage 23 exhibits a slope of $+ (\Delta f/2\Delta t)$. The larger denominator in the slope expression of these second stage compressors reflects the fact that the first pulse compressor stretched the signals by an additional $\Delta t$ in time. Hence, these second compressor stages are matched to a dispersion $(\Delta f/2\Delta t)$.

After the second pulse compressor stages, the dispersed signals will be peaked. Signals which had been peaked by the first compressor and subsequently limited, are dispersed by the second compressor, greatly reducing the amplitude of these ambiguous signals. The newly formed peak signals 35 and 36 and the corresponding further reduced ambiguous signal residue 34 and 37, will be seen in the corresponding output waveforms $(g)$ and $(h)$ of FIG. 2.

Before application to the differencing circuit 28, the waveform (g) of FIG. 2 present at 24 in FIG. 1 and the waveform (h) of FIG. 2 seen at 25 in FIG. 1 must be time-aligned. For this purpose, the fixed delay $\Delta t$ at 27 is introduced in series with the output of pulse compressor 23 in the said lower channel. The resultant signal 26 is then that represented at waveform (j) at FIG. 2. Straightforward differencing of the waveforem (g) against that of the waveform (j) of FIG. 2 is accomplished using known differencing techniques in the IF differencer 28. The waveform (k) of FIG. 2 depicts the ambiguity residue after differencing. In that particular case, no net signal resulting from the differencing of 35 and 38 is extant.

It will be noted that for point targets the said ambiguity residue is down by a factor of $4D^2$ with respect to the main signal. Here again, it will be remembered that D is the compression ratio of the system, and is equal to the product of $\Delta t$ and $\Delta f$. From this it can be shown that a system with a 20DB compression ratio will have an ambiguity residue 46DB below the channel output.

The advantages of a short interval MTI system in accordance with the present invention can be illustrated by considering, for example, a prior art S-Band system designed for 200 miles of coverage and having a 1° beamwidth in a scanning rate of 10 rpm or 60° per second. With an MTI comparison interval determined by the maximum unambiguous range of 200 statue miles, or 2,160 microseconds, the MTI performance would be limited by scan modulation to about 15 decibels with a single canceller or to about 21 decibels with a double canceller. Furthermore, such a prior art MTI system would exhibit a first blind speed of about 40 knots. The clutter attenuation on heavy wooden hills (with 20 mile per hour wind) would be limited to about 23 decibels by clutter fluctuation phenomena and to about 11 decibels on chaff and sea echo. Such numbers are typical of the type of MTI performance normally possible with prior art long range narrow beam radars when an unambiguous MTI interval is used.

It, in the same basic S-Band system, a 50 microsecond MTI interval as in the example of the present invention is employed, a first blind speed of 2000 knots would result. Furthermore, an antenna scan modulation limitation of about 50 decibels with a single canceller and clutter attenuation of 57 db on heavily wooden hills and 45 db on chaff and sea echo as limited by clutter fluctuation, could be obtained. A short MTI interval of 50 microseconds (measured from the middle of the first slope to the middle of the second slope in the transmitted pulse of the present system) also permits cancellation at IF with a high degree of stability.

An additional fact about the present system, which will suggest itself to those skilled in this art, is that the limiting process prior to final compression will inherently provide a CFAR (constantfalse-alarm-rate) action since it will tend to suppress distributed clutter or any other noise-like signal which is not compressed by the final pulse compressor. Thus, for moving targets flying in distributed clutter it can be said that it will at least provide superclutter visibility and will not report distributed clutter or incompressible signals.

The MTI performance on point targets is relatively insensitive to slow radar platform motion, such as ship movemet, pitch and roll, etc., because of the low response to the system to low velocities.

The intra-pulse MTI system of the invention could also be augmented by a conventional MTI system using long comparison intervals and the outputs of the two utilized selectively. The long comparison interval would have the advantage of higher sensitivity to slow moving targets (those with low radial velocity) and thus, could compliment the relatively poor visibility factor of the short interval MTI for slow moving targets.

From the foregoing, it will be realized however, that the performance of the present invention with relatively fast moving targets, is not subject to degradation.

Various modifications and variations of the present invention will suggest themselves to those skilled in this art. Accordingly, it is not intended that the present invention should be limited by the specific embodiment illustrated and by this description, these being regarded as typical and illustrative only.

What is claimed is:

1. An MTI Radar System comprising:
   first means for transmitting a pair of consecutive pulses of electromagnetic energy, one of said pulses being frequency modulated in a first sense and the other being frequency modulated in the opposite sense;
   second means for receiving reflected energy pulses resulting from illumination of targets by said first means, said second means comprising a pair of parallel fed channels each including pulse compression means, the frequency versus delay characteristic of said pulse compression means in each of said channels corresponding to the sense of said frequency modulation in a corresponding one of said transmitted pulses;
   time aligning means connected to delay the output of the one of said channels corresponding to the first in time of the compressed signal outputs of said channels by the time of one pulse duration;
   and pulse differencing means responsive to said delay means and the output of the other of said channels, the output of said differencing means containing primarily signals corresponding to moving targets.

2. The invention set forth in claim 1 in which said pulse compression means comprises tandem first and second pulse compressor stages in each of said channels, a first one of said channels providing a slope characteristic of $+ (\Delta F/\Delta T)$ in said first compressor stage and $- (\Delta F/2 \Delta T)$ in said second stage, and the second one of said channels providing a slope characteristic of $- (\Delta F/\Delta T)$ in said first compressor stage and $+ (\Delta F/2\Delta T)$ in said second stage.

3. Apparatus according to claim 2 including a hard limiter in each of said channels connected to limit the output of each of said first compressor stages before application to the corresponding second compressor stage.

4. Apparatus according to claim 3 in which said channels are IF frequency channels and each channel includes an IF amplifier at its input.

5. Apparatus according to claim 3 in which said time aligning means consists of an IF delay line between the output of said second compressor stage within said second channel and said pulse differencing means.

6. Apparatus according to claim 5 in which said pulse differencing means is a linear subtraction circuit.

7. Apparatus according to claim 3 in which said hard limiters are further defined as limiters having operating thresholds such that substantially all of the energy from compressed signals peaks applied thereto is removed from the output of the said first compressor stages.

* * * * *